United States Patent [19]

Kresock

[11] Patent Number: 4,486,086
[45] Date of Patent: Dec. 4, 1984

[54] ELECTRONIC FLASH APPARATUS

[75] Inventor: John M. Kresock, Elba, N.Y.

[73] Assignee: Eastman Kodak Company, Rochester, N.Y.

[21] Appl. No.: 554,670

[22] Filed: Nov. 23, 1983

[51] Int. Cl.³ .................. G03B 15/03; G03B 15/05
[52] U.S. Cl. ................................ 354/413; 354/416; 354/418; 315/241 P
[58] Field of Search .......... 354/413, 416, 417, 126, 354/127.1, 145.1, 418; 315/241 P

[56] References Cited

U.S. PATENT DOCUMENTS 2,901,671 8/1959 Most ..................... 315/219
3,296,947 1/1967 Engelsmann et al. ............. 95/1
3,682,056 8/1972 Tokutomi ..................... 95/10 CE
3,976,913 8/1976 Mashimo ..................... 315/241 P Primary Examiner—Russell E. Adams
Attorney, Agent, or Firm—Dennis P. Monteith

[57] ABSTRACT

Electronic flash apparatus produces a variable amount of flash illumination corresponding to pre-flash photographic conditions, i.e. subject distance, film speed, ambient light intensity, etc. Circuitry, which has a threshold adjustable in response to a pre-flash signal relating to the flash illumination required for the photographic conditions, monitors energy as it is delivered to a flash tube to produce flash illumination, for activating quenching circuitry to limit the discharging of a flash capacitor to an amount of energy corresponding to the pre-flash signal.

4 Claims, 1 Drawing Figure

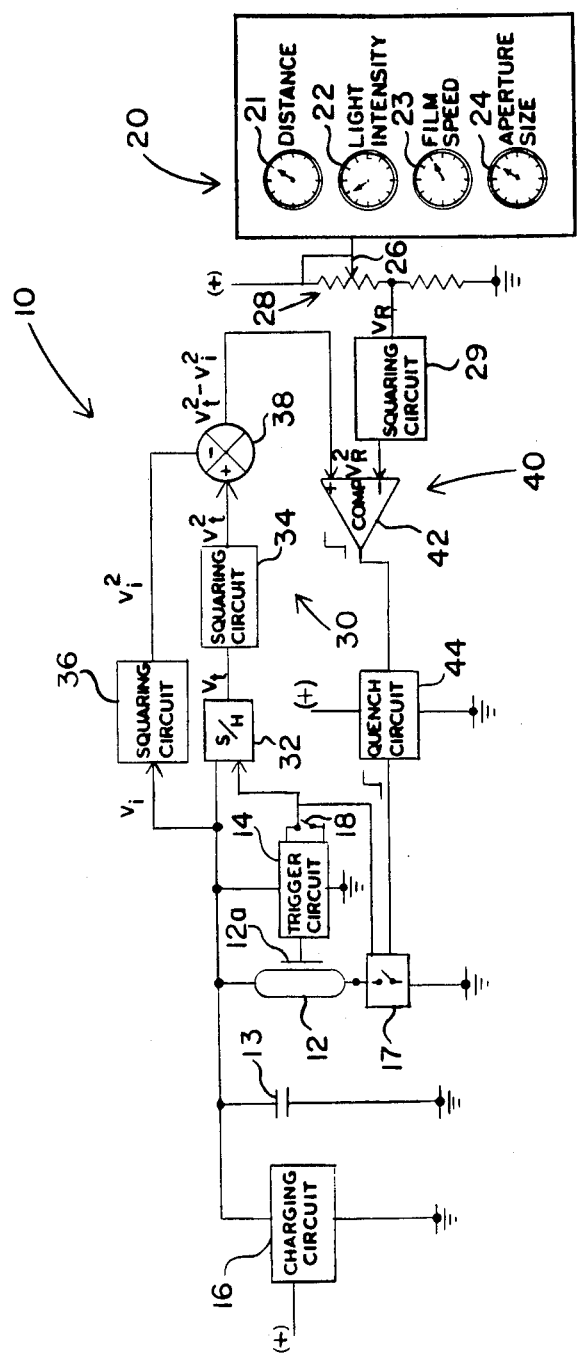

ELECTRONIC FLASH APPARATUS

BACKGROUND OF THE INVENTION

1. Field of the Invention

The invention relates to electronic flash apparatus. More particularly, the invention relates to flash apparatus for producing flash illumination corresponding to pre-flash photographic conditions.

2. Description Relative to the Prior Art

The amount of flash illumination that should be emitted to produce a proper flash exposure is dependent on photographic conditions such as camera-to-subject distance, film sensitivity, ambient light intensity, and exposure aperture size. There is known in the prior art electronic flash apparatus that emit a variable amount of flash illumination from one exposure to the next corresponding to photographic conditions that are determined prior to exposure, rather than providing either a constant light output for all exposures or a variable amount of flash light based on light actually reflected from the photographic subject during exposure. For example, U.S. Pat. Nos. 2,901,671, 3,296,947, and 3,976,913 teach the charging of a flash-firing capacitor only to a given voltage relating to the energy required to produce flash illumination corresponding to pre-flash photographic conditions. So that a flash exposure is not delayed appreciably while waiting for the charging of the flash apparatus, the capacitor may be charged to some preliminary voltage before the actual photographic conditions are known. This preliminary voltage only grossly approximates the voltage that is required. Once the actual photographic conditions are established, the charge on the capacitor is adjusted—either increased or decreased.

To charge a capacitor only to a given voltage, whether or not charging is in separate phases, complicates the flash apparatus and adds further to its cost. Furthermore, flash-firing energy is wasted whenever the capacitor is caused to discharge for a purpose other than the production of flash illumination.

U.S. Pat. No. 3,682,056 teaches an alternative arrangement in which flash apparatus always charges a flash-firing capacitor to a full-charge condition, e.g. a predetermined, maximum voltage. For a proper exposure, flash illumination is quenched when the capacitor discharges to an adjustable voltage which is related to pre-flash photographic conditions.

Because a fully charged capacitor is not required unless a photographic subject is located at the maximum flash distance, an operator of the flash apparatus of U.S. Pat. No. 3,682,056 normally would not be able to take successive flash exposures as quickly as would otherwise be possible. Furthermore, leakage current from a capacitor varies in proportion to capacitor voltage. If fully charged flash apparatus is fired infrequently, excessive charge is wasted.

SUMMARY OF THE INVENTION

In view of the foregoing problems of the prior art, an object of the invention is to produce flash illumination corresponding to pre-flash photographic conditions without the need for charging a flash apparatus precisely to a particular voltage level, maximum or otherwise. This object is achieved by an electronic flash apparatus comprising energy-monitoring circuitry which produces a control signal proportional to the energy delivered by a flash-firing capacitor to a flash tube to produce flash illumination. When this control signal exceeds an adjustable threshold determined by a pre-flash signal relating to the photographic conditions, quenching circuitry is activated to limit the discharging of the capacitor to an amount of energy corresponding to the flash illumination requirements established by the pre-flash signal.

Because flash illumination is controlled according to the energy actually delivered to the flash tube to produce flash illumination, the flash apparatus need not be charged precisely to a particular voltage, as is required with the aforementioned prior art flash apparatus. This eliminates the need to include voltage-monitoring circuitry for regulating the operation of the flash charging circuitry, and reduces the overall charging period when the photographic subject is within the maximum flash range.

The flash apparatus includes a flash tube and a firing capacitor arranged to discharge through the tube to produce flash illumination corresponding to the electrical energy the capacitor delivers to the tube. In accordance with the invention, energy-monitoring circuitry includes circuitry for producing a substantially time-invariant signal corresponding to the energy stored on the firing capacitor at the time the flash tube is triggered, and circuitry for producing a time-varying signal corresponding to the instantaneous amount of energy stored on the firing capacitor while energy is delivered to the flash tube to produce flash illumination. A difference circuit subtracts the time-varying signal from the time-invariant signal to produce a control signal, which corresponds to the energy actually delivered to the flash tube. Threshold-establishing circuitry includes a comparator for comparing this control signal to a pre-flash signal corresponding to the flash illumination required for the photographic conditions. The comparator causes quenching circuitry to apply a flash-terminating signal to an electronic switch, operatively connected with the flash tube, to quench the flash illumination when the appropriate amount of energy is delivered to the flash tube.

In a preferred embodiment of the invention, the above-mentioned electronic switch is an SCR and is connected in series with the flash tube. To quench the flash, the switch is turned off, thereby terminating further discharging of the firing capacitor. Alternatively, the switch may be connected in parallel with the flash tube. To quench the flash, the switch is turned on, wherein capacitor discharge current is caused to bypass the flash tube.

The invention and its other advantages will become more apparent in the detailed description of a preferred embodiment presented below.

DESCRIPTION OF THE DRAWINGS

In the detailed description of a preferred embodiment of the invention presented below, reference is made to the accompanying drawing which is a schematic, partly in block form, of an electronic flash unit according to the invention.

DETAILED DESCRIPTION OF A PREFERRED EMBODIMENT

Because photographic cameras and electronic flash apparatus are well known, the present description will be directed in particular to elements forming part of, or cooperating directly with, apparatus in accordance with the present invention. It is to be understood that camera and flash apparatus elements not specifically shown or described may take various forms well known to those having skill in the art.

The drawing shows an energy-saving electronic flash unit 10, which includes a flash tube 12 for emitting flash illumination in proportion to the electrical energy delivered to it, a firing capacitor 13 for supplying electrical energy to the tube 12, a conventional flash trigger circuit 14 for supplying a trigger voltage to the trigger electrode 12a, and a charging circuit 16, preferably a DC to DC converter, for charging the firing capacitor 13 and a trigger capacitor (not shown) of the trigger circuit 14 to a relatively high voltage that is necessary for firing the tube 12.

A high-speed electronic switch 17 of the type known generally in the art as a thyristor and more specifically as an SCR is connected in series to the flash tube 12. The tube 12 and the switch 17, which are connected in circuit with the capacitor 13, as shown, are triggered into conduction when the trigger circuit 14 is enabled. The latter occurs when a camera shutter (not shown) causes the closing of a trigger switch 18.

The drawing also shows photographic condition indicating means 20 for providing an output voltage signal, $V_R$, which is functionally related to the amount of flash illumination that is desired for an anticipated flash-firing operation. As is known to those skilled in the photographic art, the amount of flash illumination required to be produced for a proper flash exposure varies greatly depending on the photographic conditions in which the flash unit is operated. For example, flash photography of a long range subject requires a greater amount of flash illumination than a normal range subject, and a very fast photographic film requires less flash illumination than a slower speed film for exposing a given subject.

The indicating means 20 includes adjustable controls 21 through 24 which are individually settable according to the conditions under which flash illumination is to be produced. For example, an operator of a camera (not shown) may have decreased an exposure aperture, i.e. control 24, or may have increased the distance to a photographic subject, control 21, or may use a lower-speed film, control 23, or ambient light intensity may have decreased, control 22, as occurs when sunlight is interrupted by clouds. Normally, increased flash illumination is required in all four cases. The movement of these controls 21 through 24 moves a mechanical linkage 26 of a potentiometer 28 for varying the voltage signal, $V_R$, in proportion to the amount of flash illumination that is required for the photographic conditions set in the indicating means 20.

Assume that the controls are adjusted such that four times as much flash illumination is required for the next flash exposure compared to the previous flash exposure. Because light from a flash tube varies substantially in proportion to the energy delivered to the tube, i.e. power multiplied by time where power is proportional to the square of voltage, the voltage $V_R$ is approximately doubled to indicate a quadrupling of the desired amount of flash illumination. A squaring circuit 29 receives the voltage $V_R$ and produces a pre-flash output signal $V_R^2$, which is directly proportional to the electrical energy required to produce the desired amount of flash illumination.

In accordance with the invention, there is provided in flash unit 10 energy-monitoring circuitry 30 which monitors energy as capacitor 13 delivers it to the flash tube 12 to produce flash illumination flash illumination, and which produces a control signal that is proportional to the energy delivered. The circuitry 30 includes a sample and hold circuit 32 which is arranged to sample and store a voltage, $V_t$, corresponding to the voltage across the firing capacitor 13 at the time the trigger switch 18 is initially closed. Thus, the voltage $V_t$ corresponds to the voltage across the capacitor 13 when the flash tube 12 is triggered into conduction.

A squaring circuit 34 receives the voltage $V_t$ and produces a substantially time-invariant output signal $V_t^2$. Because the energy stored on a capacitor C charged to a voltage V is equal to $\frac{1}{2} CV^2$, the signal $V_t^2$ is directly proportional to the energy stored on the capacitor 13 at the initiating of the delivery of energy to the flash tube 12.

The circuitry 30 further includes a squaring circuit 36 connected to the capacitor 13 for producing an output signal $V_i^2$, which corresponds to the square of the instantaneous value of the voltage across the firing capacitor 13. For the same reason previously disclosed, the signal $V_i^2$ is directly proportional to the instantaneous value of the energy stored by the capacitor 13 at all times, including the discharge period of the capacitor 13. Thus, the signal $V_i^2$ is time-varying during the time the capacitor 13 is delivering energy to the flash tube 12.

The positive and negative input terminals of a difference circuit 38 are connected to receive respectively the signals $V_t^2$ and $V_i^2$. Thus, the output of the circuit 38, i.e. $V_t^2 - V_i^2$, is a control signal that is proportional to the amount of energy the firing capacitor 13 delivers to the flash tube 12.

Threshold establishing means 40 includes a comparator 42, which is adjustable in accordance with the output of the indicating means 20, to control the amount of energy delivered to the flash tube 12. The comparator 42 receives the control signal $V_t^2 - V_i^2$ and the aforementioned pre-flash signal $V_R^2$ at its positive and negative input terminals, respectively. The comparator 42 is arranged to produce a relatively low level output voltage when the signal $V_R^2$ is greater than the difference signal $V_t^2 - V_i^2$, and to produce a relatively high level output voltage when the signal $V_R^2$ is equal to less than the difference signal $V_t^2 - V_i^2$. Thus, the comparator 42 produces its low level output voltage when the capacitor 13 delivers an amount of electrical energy to the flash tube 12 that is less than the energy required to meet the flash illumination needs established by the pre-flash signal $V_R^2$, and produces its high level output voltage when the capacitor 13 delivers sufficient energy to the tube 12 to produce the flash illumination established by the pre-flash signal.

A quench circuit 44 produces a flash-terminating signal in response to the high level output voltage produced by the comparator 42. The flash-terminating signal causes the SCR 17 to turn off, thereby terminating further discharging of the capacitor 13 through the flash tube 12.

In the operation of the flash unit 10, the discharging of the firing capacitor 13 is caused solely for the production of flash illumination, and the amount of flash illumination is controlled jointly according to an output signal of the indicating means 20 and the energy the capacitor 13 delivers to the flash tube 12. Electrical energy remaining on the firing capacitor 13 when the switch 17 is turned off is retained for a subsequent operation of the tube 12. This offers advantages in that the charging circuit 16 is required to supply less energy and requires less time to recharge the capacitor 13 to a sufficiently high voltage.

It should be apparent from the above description of the operation of the flash unit 10 that the charging circuit 16 is not required to charge the capacitor 13 to a particular voltage, to control the amount of flash illumination that is produced. It is only necessary that the capacitor 13 is charged at least to a level which is sufficient for producing flash illumination according to the prevailing photographic conditions established by the pre-flash signal $V_R{}^2$. If the capacitor 13 becomes charged to a maximum voltage, control means known to those skilled in the art could be used to turn the charging circuit 16 off, to preserve the energy of the flash power source.

The invention has been described in detail with particular reference to a presently preferred embodiment thereof, but it will be understood that variations and modifications can be effected within the spirit and scope of the invention.

What is claimed is:

1. In electronic flash apparatus for producing flash illumination corresponding to an anticipated photographic exposure operation, said flash apparatus including a flash tube, an energy-storage capacitor connected to deliver electrical energy to said flash tube to produce flash illumination, photographic condition indicating means settable in accordance with the anticipated photographic exposure operation and having an output corresponding to an amount of flash illumination that is desired for the exposure operation, and quenching means for terminating the delivery of energy to said flash tube, said flash apparatus further including:
    (a) energy-monitoring means for monitoring energy as said capacitor delivers it to said flash tube; and
    (b) threshold establishing means, operably associated with said energy-monitoring means and adjustable in response to said indicating means output, for causing activation of said quenching means to terminate the delivery of energy to said flash tube when the amount of energy delivered to said flash tube corresponds to the flash illumination to which said indicating means output corresponds.

2. Flash apparatus as defined in claim 1 further including an electronic switch serially connected with said flash tube and, responsive to said quenching means, for interrupting the discharging of energy from said capacitor.

3. Flash apparatus as defined in claim 1 wherein said energy-monitoring means includes:
    (a) first circuit means, connected to said capacitor, for producing a substantially constant signal corresponding to the energy stored by said capacitor at the initiating of the delivery of energy to said flash tube;
    (b) second circuit means for producing a time-varying signal corresponding to the energy stored by said capacitor during the delivery of energy to said flash tube; and
    (c) subtracting circuit means, connected to said first and second circuit means, for determining the difference between the constant and time-varying signals, thereby measuring the energy delivered to said flash tube.

4. Flash apparatus as defined in claim 3 wherein said threshold establishing means includes a comparator circuit having a first input responsive to the difference between the constant and time-varying signals and a second input responsive to said indicating means output.

* * * * *